(No Model.)
J. M. PENDLETON.
ELECTRIC ACCUMULATOR.
No. 380,765. Patented Apr. 10, 1888.
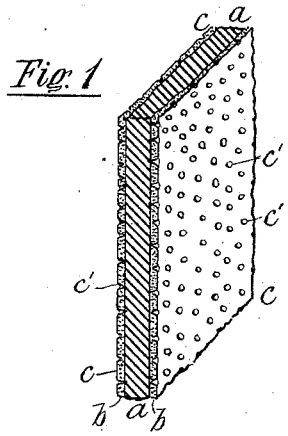
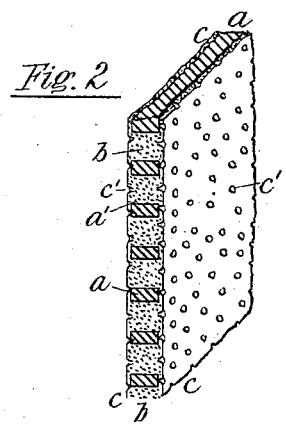
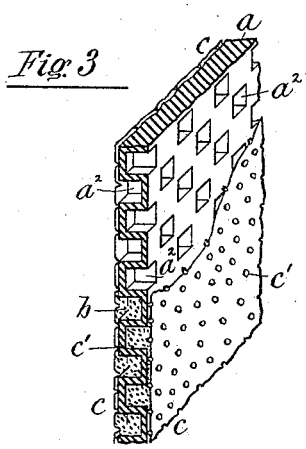
Witnesses.
H. D. Williams.
John A. Hamilton.
John M. Pendleton
Inventor
per Alfred Shedlock
atty.

UNITED STATES PATENT OFFICE.

JOHN M. PENDLETON, OF NEW BRIGHTON, NEW YORK.

ELECTRIC ACCUMULATOR.

SPECIFICATION forming part of Letters Patent No. 380,765, dated April 10, 1888.

Application filed September 1, 1887. Serial No. 248,430. (No model.)

*To all whom it may concern:*

Be it known that I, JOHN M. PENDLETON, a citizen of the United States, residing at New Brighton, in the county of Richmond and State of New York, have invented certain new and useful Improvements in Polarization-Batteries or Electric Accumulators, of which the following is a specification.

This invention relates to electrodes for polarization-batteries or electric accumulators such as shown and described in the United States Letters Patent to C. A. Faure, No. 309,838, dated December 30, 1884, assigned to and now owned by me, composed of a supporting-plate, active material, consisting of lead-foil, granulated or porous lead, oxides or salts, or other compounds of lead, applied to the surface of the supporting-plate or packed in perforations formed therein, and a metallic lead covering.

The object of my invention is to secure a better, a uniform, and a more rapid formation of the lead covering into active receptive material and to insure its close adhesion to the body of the electrode, composed of the supporting-plate and the active material applied thereto. This I attain by applying the covering in the form of lead-foil, and then, by means of suitably-pointed tools, puncturing or forcing minute holes through the foil into the active material and parts of the supporting-plate unprovided with active material, thereby causing the edges of the holes thus formed in the foil to enter the active material and the supporting-plate, thus firmly locking or binding the foil to the body of the electrode, so that it permanently retains its position thereon after being corroded or otherwise converted into active receptive material. The formation of such a lead-foil covering into receptive material, by corrosion or by means of the well-known "Planté" process, takes place uniformly throughout the whole mass of the foil, as each of the punctured openings affords a center of attack when the electrode is submitted to the forming operation.

In the accompanying drawings, forming part of this specification, Figure 1 is a perspective view of part of an electrode made according to my invention, showing a solid supporting-plate. Fig. 2 is a similar view showing the supporting-plate provided with holes for the reception of the active material, extending entirely through it; and Fig. 3 is a similar view showing the receptacles for the active material formed as pockets or recesses in the sides of the supporting-plate.

My improved electrode for electric accumulators consists of a central conducting-plate, $a$, preferably of lead, constituting the main support, the active material $b$ of which may be metallic lead in a porous state, granulated or in the form of foil, oxides, or salts of lead, or a mixture of any of these or of other compounds of lead, and lead-foil coverings $c\ c$, applied to the sides of the electrode.

The method adopted by me in the manufacture of my improved electrodes is as follows: The active material $b$ is applied to the supporting-plate $a$ in the form of paste, according to the well-known Faure method, or as suggested in his before-mentioned Letters Patent No. 309,838. The sheets of lead-foil $c\ c$ are placed in contact with the active material and with the supporting-plate $a$ where exposed, and are then operated upon by a pointed tool, a spiked roller, or other puncturing device in such a manner as to force numerous minute holes through the foil and into the material behind it without removing any metal therefrom, thereby pressing the edges of the holes thus formed through the foil into the active material or into the supporting-plate. When the electrodes so made are submitted to the forming process, the corrosion or conversion into oxide of the lead-foil envelope takes place with great rapidity, uniformity, and reliability, because the corroding agent or electrolyte of the forming-bath has free access to all parts of the foil at the edges of the numerous holes formed therein, and its total conversion into active oxide is readily assured.

These electrodes are very strong and durable, being provided with a closely-adhering tenacious oxide-of-lead covering. Peroxide of lead formed direct from the metal envelope by the Planté process, or by other processes producing similar results, is more dense, harder, and stronger than the peroxide converted over from the salts or oxides of lead. Another advantage due to this method of puncturing the lead-foil after it is applied to the sides of the electrodes is that the displacement of the foil is practically avoided, because the edges of the holes are forced into the active material applied to or packed in the supporting-plate and into the metal of the supporting-plate itself, and the said foil, both before and after its corrosion or conversion into active oxide, is thus intimately connected to the other parts of the electrode.

The conducting-support $a$ is represented at Fig. 1 as a solid plate of lead, with the material $b$ uniformly plastered over its sides, and with the sheets of foil $c$ $c$ applied to the material $b$ and punctured as described, so as to force the edges of the holes $c'$ $c'$ into the material $b$.

In Fig. 2 the supporting-plate $a$ is provided with holes $a'$ $a'$, formed entirely through it, and into these holes the active material $b$ or material to become active is closely packed, said material in some cases also covering the sides of the support $a$. Instead of forming the holes entirely through the supporting-plate $a$ for the reception of the material $b$, recesses or pockets $a^2$ $a^2$ may be made in the sides of the plate, as shown at Fig. 3. As these recesses have closed bottoms, the plate $a$ is stronger and more rigid than with holes passing entirely through it.

Sheets of lead-foil $c$ $c$ are applied to the sides of the electrodes shown at Figs. 2 and 3 and punctured in the manner before described.

The electrodes may be made up complete, as set forth, and the material $b$ and foil $c$ corroded or converted into active condition together at one operation; or the material $b$, in any of the styles of electrodes described, may be formed or converted into condition for battery use before the lead-foil covering is applied, and the lead foil then placed in position and punctured and subsequently converted into active oxide by means of the Planté process. This latter method I prefer to adopt in the manufacture of my improved electrode for electric accumulators.

Having now described my invention, what I claim as new, and desire to secure by Letters Patent, is—

1. The improved method of making electrodes for electric accumulators, composed of a conducting-support, a receptive material of lead oxide or salt of lead applied thereto, and a metal covering which consists in first applying the receptive material to the support, then placing sheets of metal foil in contact therewith, and, lastly, puncturing or forcing small holes through the metal foil into the prepared body of the support, substantially as and for the purpose set forth.

2. The improved method of making and forming electrodes for electric accumulators, which consists in first applying to a lead supporting-plate a receptive material of lead oxide or salt of lead, then submitting said prepared plate to a conversion process, then placing sheets of metal foil in contact with the plate when "formed," and puncturing or forcing small holes through the metal foil into the formed plate, and, lastly, converting the lead-foil into active material.

Signed at New York, county and State of New York, this 29th day of August, 1887.

JOHN M. PENDLETON.

Witnesses:
H. D. WILLIAMS,
ALFRED SHEDLOCK.